(12) United States Patent
Ye et al.

(10) Patent No.: US 11,778,962 B2
(45) Date of Patent: Oct. 10, 2023

(54) SWINGING PIPE WITH ADJUSTABLE SPRAYING ANGLE

(71) Applicant: NINGBO DAYE GARDEN INDUSTRY CO., LTD., Zhejiang (CN)

(72) Inventors: Xiaodong Ye, Ningbo (CN); Qinbo Li, Ningbo (CN)

(73) Assignee: NINGBO DAYE GARDEN INDUSTRY CO., LTD., Zhejiang (CN)

( * ) Notice: Subject to any disclaimer, the term of this patent is extended or adjusted under 35 U.S.C. 154(b) by 478 days.

(21) Appl. No.: 17/014,873

(22) Filed: Sep. 8, 2020

(65) Prior Publication Data
US 2021/0092915 A1 Apr. 1, 2021

(30) Foreign Application Priority Data
Sep. 30, 2019 (CN) .......................... 201921651555.7

(51) Int. Cl.
*A01G 25/02* (2006.01)
*A01G 25/16* (2006.01)

(52) U.S. Cl.
CPC ............. *A01G 25/02* (2013.01); *A01G 25/16* (2013.01)

(58) Field of Classification Search
CPC ........ A01G 25/02; A01G 25/16; A01G 25/00; B05B 3/044; B05B 3/021; B05B 3/0454; B05B 3/14; B05B 3/00; B05B 1/20; B05B 1/202; B05B 1/3026; B05B 1/083; B05B 1/205; B05B 15/652; B05B 15/625; B05B 15/68; B05B 15/65; Y10S 239/01
See application file for complete search history.

(56) References Cited

U.S. PATENT DOCUMENTS

2016/0354792 A1* 12/2016 Su .......................... A01G 25/16

* cited by examiner

*Primary Examiner* — Christopher R Dandridge
*Assistant Examiner* — Juan C Barrera
(74) *Attorney, Agent, or Firm* — Ladas & Parry, LLP (57) ABSTRACT

The invention discloses a swinging pipe with an adjustable spraying angle, structurally including a pipe body, a flexible spraying pipe, a sliding block and the like, and is mainly characterized in that two sides of an inner end of the sliding block are in articulated connection with inner walls of two sides of a sealing cap in an axial reciprocating motion manner, an outer end of the sliding block is movably assembled in a driving chute of an angle adjusting push rod, and lifts by radial reciprocating motion of the angle adjusting push rod; and converting structures are respectively arranged between two sides of the outer end of the sliding block and the inner walls of the two sides of the sealing cap, by the converting structures, lifting motion of the sliding block is converted into axial reciprocating motion, and thus, the top ends of a plurality of flexible spraying pipes are driven to be simultaneously in an upright state or an axial outward inclined state at different angles on a top of the sealing cap. Because the flexible spraying pipe is simultaneously provided with forced resetting structures in a transverse driving mode and an inclined driving mode, during actual use, limitation by manufacturing materials of the flexible spraying pipe is avoided, a using angle of the flexible spraying pipe is conveniently adjusted in real time, a good using effect is achieved, and the swinging pipe brings great convenience for a user during use.

9 Claims, 11 Drawing Sheets

SWINGING PIPE WITH ADJUSTABLE SPRAYING ANGLE

CROSS-REFERENCE TO RELATED APPLICATION

This application claims a priority to Chinese Patent Application No. 201921651555.7 filed in China on Sep. 30, 2019, the disclosure of which is incorporated herein by reference in its entirety.

BACKGROUND

Technical Field

The invention relates to a spraying tool for spraying irrigation of landscaping, in particular to a swinging pipe with an adjustable spraying angle.

Related Art

A swinging pipe with an adjustable spraying angle is a common tool for spraying irrigation of landscaping, and mainly structurally includes a pipe body, a water inlet cavity at a bottom of the pipe body, a plurality of flexible spraying pipes on the water inlet cavity, a sliding block on the plurality of flexible spraying pipes, a sealing cap, a swinging pipe connecting piece, a water flowing needle seat and the like, a bottom end of each flexible spraying pipe communicates with the water inlet cavity in a sealed manner, a top end of each flexible spraying pipe successively penetrates through the sliding block and the sealing cap and is then exposed, and after a water source is connected into the water inlet cavity, water can be sprayed out through the plurality of flexible spraying pipes; meanwhile, the pipe body is further provided with an angle adjusting component to drive the sliding block to carry out axial reciprocating motion, thus, the top ends of the plurality of flexible spraying pipes can be driven to simultaneously achieve inclination adjustment of axial reciprocating motion at different angles on a top of the sealing cap, watering demands of multiple regions of a user are met, and irrigation in regions with different areas is facilitated. However, the angle adjusting component pulls the sliding block to move by a transverse angle only and then drives the flexible spraying pipe to be inclined and bent, due to limitation of elastic materials for manufacturing the flexible spraying pipe, the flexible spraying pipe usually needs a long time to reset to an upright state after being bent and deformed, that is, the time for resetting from a maximum spraying angle to a minimum spraying angle again is long, a spraying angle cannot be adjusted in real time, therefore, a good using effect is difficult to achieve in actual use, and great inconvenience is brought to the user.

SUMMARY

The technical problem to be solved by the invention is to overcome the defects in the prior art, and provide a swinging pipe with an adjustable spraying angle, according to the swinging pipe with the adjustable spraying angle, flexible spraying pipes are simultaneously forced to reset to an upright state or an axial outward inclined state through a transverse driving mode and an inclined driving mode, a using angle of the flexible spraying pipes can be adjusted in real time, a good using effect is achieved, and great convenience is brought to a user during use.

The technical problem of the invention is solved by the following technical solutions.

A swinging pipe with an adjustable spraying angle includes a pipe body, a water inlet cavity at a bottom of the pipe body, a plurality of flexible spraying pipes mounted on the water inlet cavity, a sliding block mounted on the plurality of flexible spraying pipes, a sealing cap detachably buckled on a top of the pipe body and enclosing the plurality of flexible spraying pipes and the sliding block as well as a swinging pipe connecting piece and a water flowing needle seat which are respectively arranged at two ends of the pipe body, and the water flowing needle seat communicates with the water inlet cavity; a bottom end of each flexible spraying pipe communicates with the water inlet cavity in a sealed manner, a top end of each flexible spraying pipe successively penetrates through the sliding block and the sealing cap and is then exposed, two sides of an inner end of the sliding block are respectively in articulated connection with inner walls of two sides of the sealing cap in an axial reciprocating motion manner, an outer end of the sliding block is movably assembled in a driving chute of an angle adjusting push rod, the angle adjusting push rod is mounted in the sealing cap in a radial reciprocating motion manner and drives the outer end of the sliding block to carry out up-down reciprocating motion in the driving chute so as to lift the outer end of the sliding block; and converting structures are respectively arranged between two sides of the outer end of the sliding block and the inner walls of the two sides of the sealing cap respectively, by the converting structures, lifting motion of the outer end of the sliding block is converted into axial reciprocating motion of the sliding block so as to drive the top ends of the plurality of flexible spraying pipes to be simultaneously in an upright state or an axial outward inclined state at different angles on the top of the sealing cap.

According to the structure that the two sides of the inner end of the sliding block are respectively in articulated connection with the two sides of the inner wall of the sealing cap in an axial reciprocating motion manner, articulated shafts are respectively arranged on the two sides of the inner end of the sliding block, horizontal transverse grooves corresponding to the articulated shafts on the two sides are respectively formed in the inner walls of the two sides of the sealing cap correspondingly, and the articulated shafts are rotatably assembled in the horizontal transverse grooves, and carry out axial reciprocating motion along the horizontal transverse grooves.

The converting structure includes sliding shafts which are respectively arranged on two sides of the outer end of the sliding block, vertical inclined sliding grooves corresponding to the sliding shafts on the two sides are respectively formed in the inner walls of the two sides of the sealing cap correspondingly, and the sliding shafts are slidably assembled in the vertical inclined sliding grooves, and carry out up-down reciprocating motion along the vertical inclined sliding grooves.

The driving chute and the vertical inclined sliding groove are '/'-shaped, the outer end of the sliding block is positioned at a topmost end of the driving chute, the sliding shaft is also positioned at a topmost end of the vertical inclined sliding groove, and the top ends of the plurality of flexible spraying pipes are simultaneously in an upright state on the top of the sealing cap; and the outer end of the sliding block is positioned at a bottom most end of the driving chute, the sliding shaft also slides to a bottommost end of the vertical inclined sliding groove and drives the sliding block to axially outwards move, and the top ends of the plurality of flexible spraying pipes are simultaneously in an axial outward inclined state at a maximum angle on the top of the sealing cap.

An outer shaft which is movably assembled in the driving chute is arranged at the outer end of the sliding block, a length of the outer shaft is greater than a width of the driving chute, and the outer shaft carries on up-down reciprocating motion and axial reciprocating motion in the driving chute.

A distance of axial reciprocating motion of the outer shaft in the driving chute equals to an axial distance of the sliding shaft sliding from the topmost end of the corresponding vertical inclined sliding groove to the bottommost end of the vertical inclined sliding groove.

A radial mounting hole which allows the angle adjusting push rod to carry out radial reciprocating motion is formed in the sealing cap, an upright mark and an inclined mark are respectively arranged at two ends of the angle adjusting push rod, the angle adjusting push rod drives the top ends of the plurality of flexible spraying pipes to be simultaneously in an upright state on the top of the sealing cap via the sliding block, and the inclined mark is exposed while the upright mark is hidden in the radial mounting hole; and the angle adjusting push rod drives the top ends of the plurality of flexible spraying pipes to be simultaneously in an axial outward inclined state at a maximum angle on the top of the sealing cap via the sliding block, and the upright mark is exposed while the inclined mark is hidden in the radial mounting hole.

The water inlet cavity refers to a cavity structure formed by sealing a top of a groove in the bottom of the pipe body by a spraying pipe plate, and the spraying pipe plate is provided with a plurality of water outlet holes of which the number is the same as that of the flexible spraying pipes; and the plurality of flexible spraying pipes are integrally formed on a flexible plate, the flexible plate is mounted on the spraying pipe plate, and the bottom end of each flexible spraying pipe communicates with the water inlet cavity in a sealed manner via the corresponding water outlet hole.

The sliding block is provided with a plurality of through holes of which the number is the same as that of the flexible spraying pipes; and the sealing cap is provided with a plurality of top holes of which the number is the same as that of the flexible spraying pipes, the plurality of top holes are straight round holes extending in the axial direction, and lengths of the plurality of top holes are successively increased from inside to outside.

The top surface of the sliding block is a plane, the plurality of through holes are successively arranged on the plane at intervals in an axial direction, the top ends of the flexible spraying pipes penetrate in the corresponding through holes and extend out at equal heights, or the top surface of the sliding block is a step surface raised from outside to inside step by step, each step surface is provided with a through hole, the top ends of the flexible spraying pipes penetrate in the corresponding through holes, and extend out from outside to inside at heights reduced step by step.

Compared with the prior art, the invention has the characteristics that the two sides of the inner end of the sliding block are respectively in articulated connection with the inner walls of the two sides of the sealing cap in an axial reciprocating motion manner, the outer end of the sliding block is movably assembled in the driving chute of the angle adjusting push rod, and the angle adjusting push rod is mounted in the sealing cap in a radial reciprocating motion manner and drives the outer end of the sliding block to carry out up-down reciprocating motion in the driving chute so as to lift the outer end of the sliding block; and the converting structures are respectively arranged between the two sides of the outer end of the sliding block and the inner walls of the two sides of the sealing cap, by the converting structures, lifting motion of the outer end of the sliding block is converted into axial reciprocating motion of the sliding block, and thus, the top ends of the plurality of flexible spraying pipes can be driven to be simultaneously in an upright state or an axial outward inclined state at different angles on the top of the sealing cap. The above driving structure of the flexible spraying pipe is a forced resetting structure which has a transverse driving mode and an inclined driving mode simultaneously, therefore, during actual use, limitation by the manufacturing materials of the flexible spraying pipes is avoided, the using angle of the flexible spraying pipes is adjusted conveniently in real time, a good using effect is achieved, and the swinging pipe brings great convenience for a user during use.

DETAILED DESCRIPTION

The embodiments of the invention are further described in detail below with reference to the foregoing accompanying drawings.

As shown in FIG. 1 to FIG. 11, 1—swinging pipe connecting piece, 2—angle adjusting push rod, 21—driving chute, 22—upright mark, 23—inclined mark, 3—sealing cap, 31—vertical inclined sliding groove, 32—top hole, 33—radial mounting hole, 34—horizontal transverse groove, 35—catching groove, 4—flexible spraying pipe, 41—flexible plate, 5—water flowing needle seat, 6—pipe body, 61—water inlet cavity, 7—spraying pipe plate, 8—sliding block, 81—outer shaft, 82—articulated shaft, 83—sliding shaft, 84—through hole, 9—spraying pipe plate, 91—water outlet hole, and 92—buckle plate.

A swinging pipe with an adjustable spraying angle, as shown in FIG. 1 to FIG. 7, mainly relates to a garden spraying tool, top ends of a plurality of flexible spraying pipes 4 in the swinging pipe are adjusted to be inclined in various angle ranges in an axial direction of the swinging pipe, when the swinging pipe swings in a radial direction, the garden spraying tool can cover different areas for spraying, and the swinging pipe with an adjustable spraying angle is widely suitable for irrigation and maintenance of gardens, nursery gardens, lawns and the like, and is also suitable for cooling a building roof, or maintaining road construction and treating dust, coal dust and the like.

The swinging pipe is mainly composed of a pipe body 6, a water inlet cavity 61 at a bottom of the pipe body, a plurality of flexible spraying pipes 4 on the water inlet cavity, a sliding block 8 on the plurality flexible spraying pipes, a sealing cap 3, a swinging pipe connecting piece 1, a water flowing needle seat 5 and the like.

The pipe body 6 is a horizontal transverse pipe, the swinging pipe connecting piece 1 and the water flowing needle seat 5 are respectively arranged at two ends of the pipe body 6, and are mainly configured to mount the swinging pipe on a swinging seat to achieve radial swinging; the water inlet cavity 61 refers to a cavity structure formed by sealing a top of a semi-circular groove in the bottom of the pipe body 6 by a rectangular spraying pipe plate 9, and the spraying pipe plate 9 is provided with a plurality of water outlet holes 91 which are arranged linearly in an axial direction and are arranged at equal distances; and the water flowing needle seat 5 communicates with the water inlet cavity 61 so as to facilitate the connection of a water source into the water inlet cavity 61.

Figure 7:
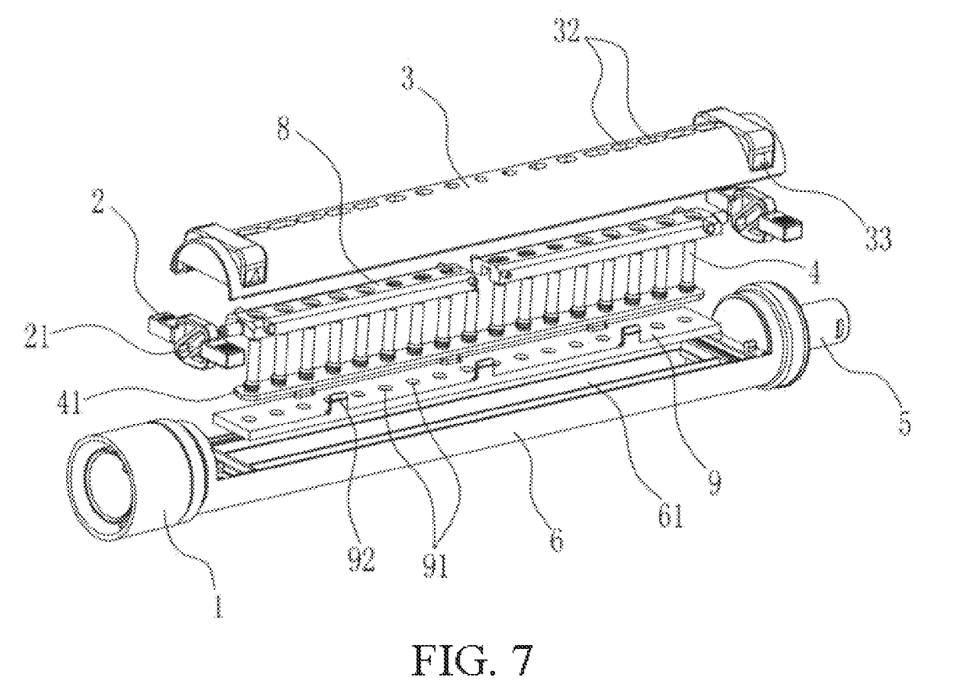
FIG. 7 is a three-dimensional exploded view according to the invention.

The plurality of flexible spraying pipes 4 are integrally formed on a flexible plate 41, the number and positions of the flexible spraying pipes 4 are the same as those of a plurality of water outlet holes 91, and therefore, after the flexible plate 41 is mounted on the spraying pipe plate 9, a bottom end of each flexible spraying pipe 4 communicates with the water inlet cavity 61 in a sealed manner via the corresponding water outlet hole 91.

The sliding block 8 is of a rod-shaped structure, an angle adjusting push rod 2 which drives the sliding block in a matched manner is arranged at an outer end of the sliding block 8, in the present embodiment, two sets of sliding blocks 8 and angle adjusting push rods 2 are arranged, and are respectively mounted at two ends of the pipe body 6, and since the two sets of structures are completely the same, the present embodiment will only take one of the two sets of structures as an example for detailed description.

The sliding block 8 is provided with a plurality of through holes 84 of which the number and positions are the same as those of the flexible spraying pipes 4; the sealing cap 3 is an arc-shaped sealing cap, after being detachably buckled on a buckle plate 92 at a corresponding position of the spraying pipe plate 9 through a plurality of catching grooves 35 at different positions, the sealing cap completely covers a top of the pipe body 6, thus the pipe body 6 becomes a cylinder exactly, and encloses components such as the flexible spraying pipes 4 and the sliding block 8, the sealing cap 3 is also provided with a plurality of top holes 32 of which the number and positions are the same as those of the flexible spraying pipes 4, and top ends of the flexible spraying pipes 4 successively penetrate through the corresponding through holes 84 in the sliding block 8 and the corresponding top holes 32 in the sealing cap 3 and are then exposed.

Figure 8:
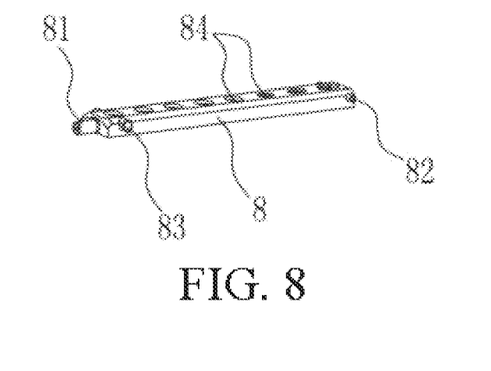
FIG. 8 is a schematic view of a first structure of a sliding block.
Figure 9:
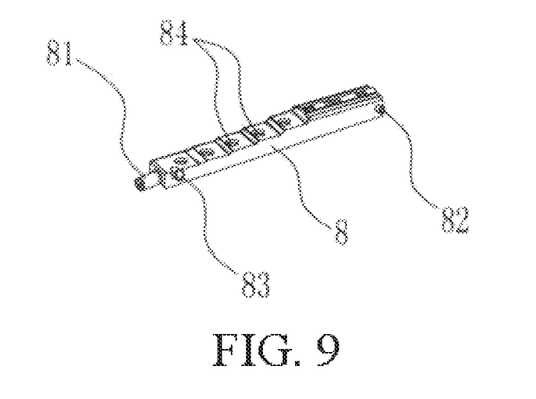
FIG. 9 is a schematic view of a second structure of the sliding block.

A top surface of the sliding block 8 has two structural forms, one form is a plane as shown in FIG. 8, the through holes 84 are successively formed in the plane at intervals in an axial direction, and the top ends of the flexible spraying pipes 4 penetrate in the corresponding through holes 84 and extend out at equal heights; and the other form is a step surface raised step by step from outside to inside as shown in FIG. 9, each step surface is provided with a through hole 84, and the top ends of the flexible spraying pipes 4 penetrate in the corresponding through holes 84, and extend out from outside to inside at heights reduced step by step. Both the sliding block 8 in the two top surface forms can be used, but the sliding block 8 with the step surface as the top surface can adjust a larger spraying angle.

The plurality of top holes 32 are straight round holes extending in an axial direction, and lengths of the plurality of top holes 32 are successively increased from inside to outside, so that the top ends of the flexible spraying pipes 4 can be conveniently bent angularly.

Figure 11:
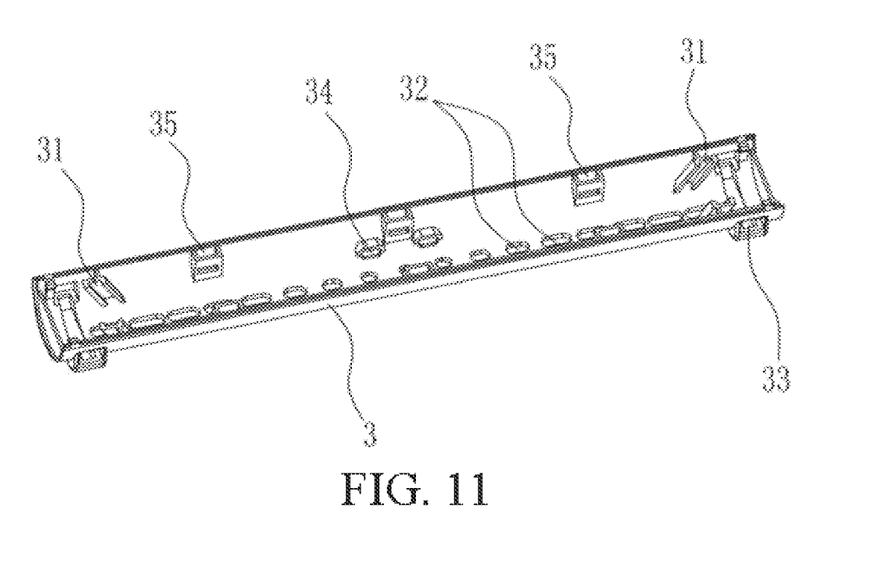
FIG. 11 is a schematic structural view of an inner wall of a sealing cap.

Two sides of an inner end of the sliding block 8 are respectively in articulated connection with inner walls of two sides of the sealing cap 3 in an axial reciprocating motion manner, according to the specific structure, articulated shafts 82 are respectively arranged on the two sides of the inner end of the sliding block 8, horizontal transverse grooves 34 corresponding to the articulated shafts on the two sides are respectively formed in the inner walls of the two sides of the sealing cap 3, a length of the horizontal transverse grooves extends in an axial direction, therefore, after being rotatably assembled in the horizontal transverse grooves 34, the articulated shafts 82 can further carry out axial reciprocating motion along the horizontal transverse grooves 34, and then rotation and movement of the articulated shafts 82 in the horizontal transverse grooves 34 are realized.

Figure 10:
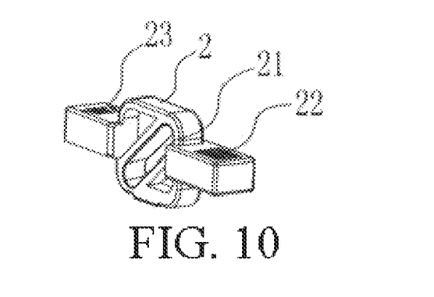
FIG. 10 is a schematic enlarged view of an angle adjusting push rod.

The outer end of the sliding block 8 is movably assembled in the driving chute 21 of the angle adjusting push rod 2 through an outer shaft 81, the driving chute is '/'-shaped as shown in FIG. 10, a length of the outer shaft 81 is greater than a width of the driving chute 21, and thus, the outer shaft 81 can carry out up-down reciprocating motion and axial reciprocating motion in the driving chute 21.

The angle adjusting push rod 2 is mounted in the radial mounting hole 33 of the sealing cap 3 in a radial reciprocating motion manner, an upright mark 22 and an inclined mark 23 are respectively arranged at two ends of the angle adjusting push rod 2, generally, the inclined mark 23 is exposed while the upright mark 22 is hidden in the radial mounting hole 33, and in this case, a spraying angle of the swinging pipe is minimum; and on the contrary, the upright mark 22 is exposed while the inclined mark 23 is hidden in the radial mounting hole 33, and in this case, the spraying angle of the swinging pipe is maximum.

Meanwhile, converting structures are respectively arranged between two sides of the outer end of the sliding block 8 and the inner walls of the two sides of the sealing cap 3, the converting structure includes sliding shafts 83 which are respectively arranged on the two sides of the outer end of the sliding block 8, correspondingly, vertical inclined sliding grooves 31 corresponding to the sliding shafts 83 on the two sides as shown in FIG. 11 are respectively formed in the inner walls of the two sides of the sealing cap 3, the vertical inclined sliding grooves are also '/'-shaped, and the sliding shafts 83 are slidably assembled in the vertical inclined sliding grooves 31, and then can carry out up-down reciprocating motion along the vertical inclined sliding grooves. In this case, a distance of axial reciprocating motion of the outer shaft 81 in the driving chute 21 exactly equals to an axial distance of the sliding shaft 83 sliding from a topmost end of the vertical inclined sliding groove 31 to a bottommost end of the vertical inclined sliding groove 31.

From this it can be clearly seen that radial reciprocating motion of the angle adjusting push rod 2 can drive the outer end of the sliding block 8 to carry out up-down reciprocating motion in the driving chute 21 so as to lift the outer end of the sliding block 8, through the converting structures, lifting motion of the outer end of the sliding block 8 can be converted into axial reciprocating motion of the sliding block 8, and thus, the top ends of the plurality of flexible spraying pipes 4 can be driven to be simultaneously in an upright state or an axial outward inclined state at different angles on the top of the sealing cap 3. That is, the driving structure of the flexible spraying pipe 4 is a forced reset structure which has a transverse driving mode and an inclined driving mode.

Figure 1:
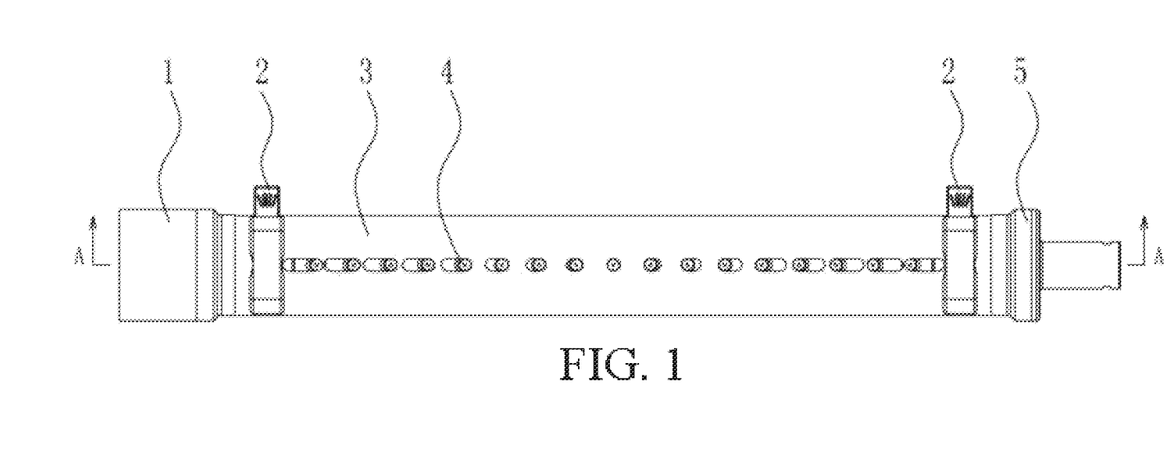
FIG. 1 is a schematic structural view of a minimum spraying angle according to the invention.
Figure 2:
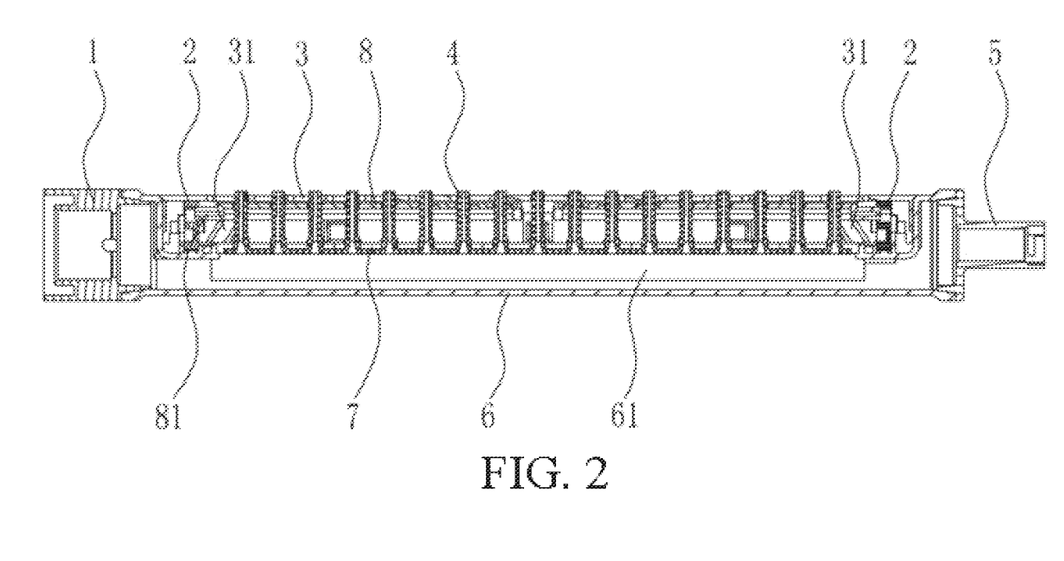
FIG. 2 is a cross-sectional view taken along a line A-A of FIG. 1.
Figure 3:
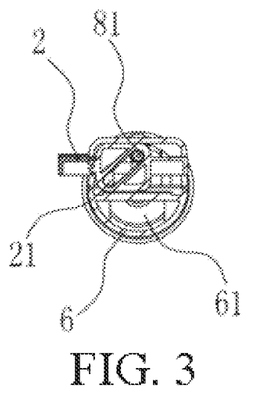
FIG. 3 is a schematic cross-sectional structural view of an outer shaft positioned at a topmost end of a driving chute in FIG. 1.
Figure 4:
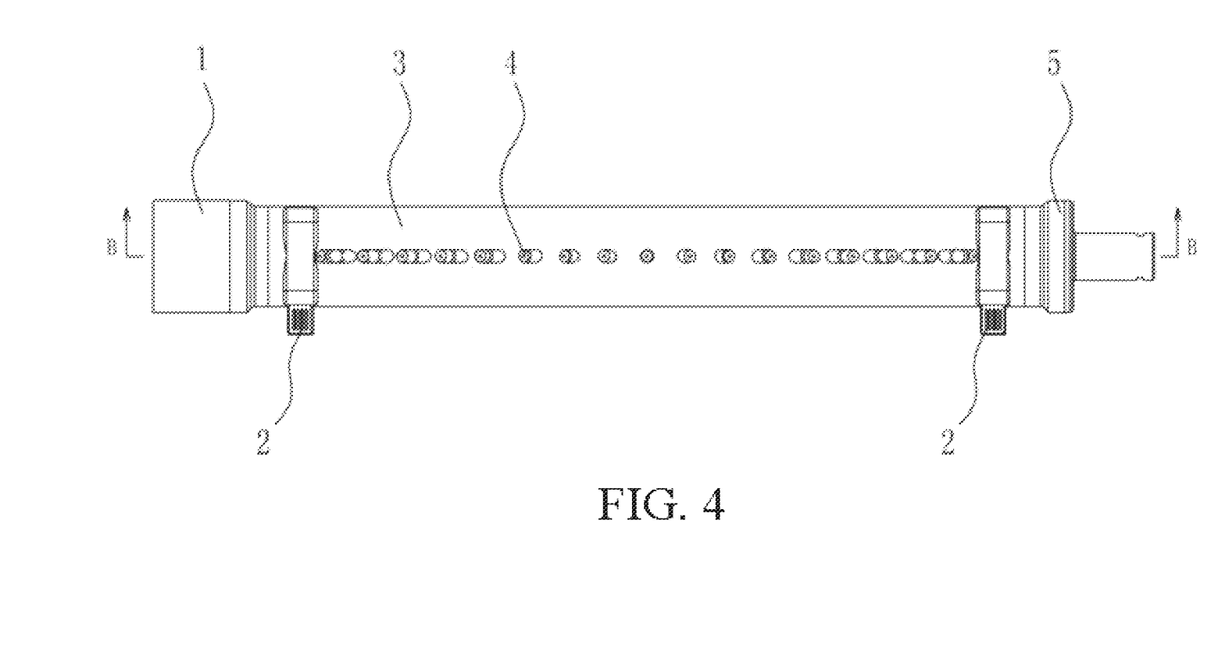
FIG. 4 is a schematic structural view of a maximum spraying angle according to the invention.
Figure 5:
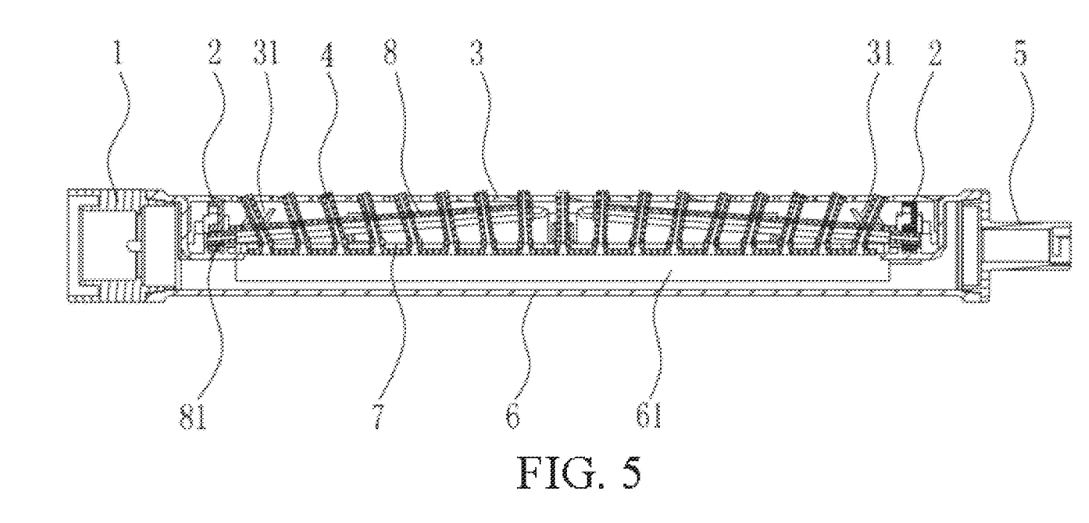
FIG. 5 is a cross-sectional view taken along a line B-B of FIG. 4.
Figure 6:
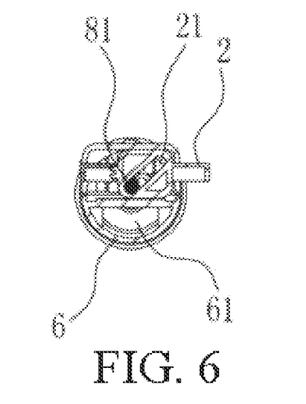
FIG. 6 is a schematic cross-sectional structural view of the outer shaft positioned at a bottommost end of the driving chute in FIG. 4.

Therefore, the swinging pipe of the invention can be at a minimum spraying angle and a maximum spraying angle, the minimum spraying angle is as shown in FIG. 1 to FIG. 3, when the inclined mark 23 is exposed while the upright mark 22 is hidden in the radial mounting hole 33, the outer shaft 81 at the outer end of the sliding block 8 is positioned at a topmost end of the driving chute 21, the sliding shaft 83 is also positioned at the topmost end of the vertical inclined sliding groove 31, and in this case, the top ends of the plurality of flexible spraying pipes 4 are simultaneously in an upright state on the top of the sealing cap 3; and the maximum spraying angle is as shown in FIG. 4 to FIG. 6, when the upright mark 22 is exposed while the inclined mark 23 is hidden in the radial mounting hole 33, the outer shaft 81 at the outer end of the sliding block 8 is positioned at a bottommost end of the driving chute 21, the sliding shaft 83 also slides to the bottommost end of the vertical inclined sliding groove 31, and drives the sliding block 8 to move axially outwards, and in this case, the top ends of the plurality of flexible spraying pipes 4 can be simultaneously in the axial outward inclined state at the maximum angle on the top of the sealing cap 3.

An angle between the minimum spraying angle and the maximum spraying angle is suitable, and it is only necessary to control a radial movement position of the angle adjusting push rod 2 in the radial mounting hole 33.

Because inclination angles of the top ends of the plurality of flexible spraying pipes 4 are forcedly controlled by the angle adjusting push rod 2 instead of automatically resetting by elasticity of the materials of the flexible spraying pipes, during actual use, limitation by the manufacturing materials of the flexible spraying pipes is avoided, the using angle of the flexible spraying pipes is conveniently adjusted in real time, a good using effect is achieved, and the swinging pipe brings great convenience for a user during use.

The foregoing descriptions are merely specific embodiments of the invention, and a person skilled in the art should understand that any structural design equivalent to the embodiments shall fall within the protection scope of the invention.

What is claimed is:

1. A swinging pipe with an adjustable spraying angle, comprising:
a pipe body, a water inlet cavity at a bottom of the pipe body, a plurality of flexible spraying pipes mounted on the water inlet cavity, a sliding block mounted on the plurality of flexible spraying pipes, a sealing cap detachably buckled on a top of the pipe body and configured to enclose the plurality of flexible spraying pipes and the sliding block, and a swinging pipe connecting piece and a water flowing needle seat respectively arranged at two ends of the pipe body, wherein the water flowing needle seat is configured to communicate with the water inlet cavity; a bottom end of each flexible spraying pipe is configured to communicate with the water inlet cavity in a sealed manner, a top end of each flexible spraying pipe successively penetrating through the sliding block and the sealing cap and being then exposed, wherein two sides of an inner end of the sliding block are respectively in articulated connection with inner walls of two sides of the sealing cap in an axial reciprocating motion manner, an outer end of the sliding block is movably assembled in a driving chute of an angle adjusting push rod, the angle adjusting push rod is mounted in the sealing cap in a radial reciprocating motion manner, and drives the outer end of the sliding block to carry out up-down reciprocating motion in the driving chute so as to lift the outer end of the sliding block; and converting structures are respectively arranged between two sides of the outer end of the sliding block and the inner walls of the two sides of the sealing cap, and by the converting structures, lifting motion of the outer end of the sliding block is converted into axial reciprocating motion of the sliding block, and then drives top ends of the plurality of flexible spraying pipes to be simultaneously in an upright state or in an axial outward inclined state at different angles on a top of the sealing cap;
wherein a radial mounting hole allowing the angle adjusting push rod to carry out radial reciprocating motion is formed in the sealing cap, an upright mark and an inclined mark are respectively arranged at two ends of the angle adjusting push rod, the angle adjusting push rod is configured to drive the top ends of the plurality of flexible spraying pipes to be simultaneously in an upright state on the top of the sealing cap via the sliding block, and the inclined mark is exposed while the upright mark is hidden in the radial mounting hole; and the angle adjusting push rod is configured to drive the top ends of the plurality of flexible spraying pipes to be simultaneously in an axial outwards inclined state at a maximum angle on the top of the sealing cap via the sliding block, and the upright mark is exposed while the inclined mark is hidden in the radial mounting hole.

2. The swinging pipe with an adjustable spraying angle according to claim 1, wherein articulated shafts are respectively arranged on the two sides of the inner end of the sliding block, horizontal transverse grooves corresponding to the articulated shafts on the two sides are respectively formed in the inner walls of the two sides of the sealing cap correspondingly, and the articulated shafts are rotatably assembled in the horizontal transverse grooves, and are configured to carry out axial reciprocating motion along the horizontal transverse grooves.

3. The swinging pipe with an adjustable spraying angle according to claim 1, wherein the converting structures comprise sliding shafts which are respectively arranged on two sides of the outer end of the sliding block, vertical inclined sliding grooves corresponding to the sliding shafts on the two sides are respectively formed in the inner walls of the two sides of the sealing cap correspondingly, and the sliding shafts are slidably assembled in the vertical inclined sliding grooves, and carry out up-down reciprocating motion along the vertical inclined sliding grooves.

4. The swinging pipe with an adjustable spraying angle according to claim 3, wherein the driving chute and the vertical inclined sliding groove are configured to be in an inclined shape, the outer end of the sliding block is positioned at a topmost end of the driving chute, the sliding shaft is also positioned at a topmost end of the vertical inclined sliding groove, and the top ends of the plurality of flexible spraying pipes are simultaneously in an upright state on the top of the sealing cap; and the outer end of the sliding block is positioned at a bottommost end of the driving chute, the sliding shaft is configured to slide to a bottommost end of the vertical inclined sliding groove, and drive the sliding block to axially move outwards, and the top ends of the plurality of flexible spraying pipes are simultaneously in an axial outward inclined state at a maximum angle on the top of the sealing cap.

5. The swinging pipe with an adjustable spraying angle according to claim 4, wherein an outer shaft which is movably assembled in the driving chute is arranged at the outer end of the sliding block, a length of the outer shaft is greater than a width of the driving chute, and the outer shaft is configured to carry out up-down reciprocating motion and axial reciprocating motion in the driving chute.

6. The swinging pipe with an adjustable spraying angle according to claim 5, wherein a distance of axial reciprocating motion of the outer shaft in the driving chute equals to an axial distance of the sliding shaft sliding from the topmost end of the vertical inclined sliding groove to the bottommost end of the vertical inclined sliding groove.

7. The swinging pipe with an adjustable spraying angle according to claim 1, wherein the water inlet cavity comprises a cavity structure formed by sealing a top of a groove in the bottom of the pipe body by using a spraying pipe plate, and the spraying pipe plate is provided with a plurality of water outlet holes of which the number is the same as that of the flexible spraying pipes; and the plurality of flexible spraying pipes are integrally formed on a flexible plate, the flexible plate is mounted on the spraying pipe plate, and the bottom end of each flexible spraying pipe is configured to communicate with the water inlet cavity in a sealed manner via the corresponding water outlet hole.

8. The swinging pipe with an adjustable spraying angle according to claim 1, wherein the sliding block comprises a plurality of through holes of which the number is the same as that of the flexible spraying pipes; and the sealing cap comprises a plurality of top holes of which the number is the same as that of the flexible spraying pipes, the plurality of top holes are configured to extend in an axial direction with axial lengths of the plurality of top holes successively increased from middle towards each end of the sealing cap.

9. The swinging pipe with an adjustable spraying angle according to claim 8, wherein a top surface of the sliding block is a plane, the plurality of through holes are successively formed in the plane at intervals in an axial direction, the top ends of the flexible spraying pipe are configured to penetrate in the corresponding through holes and extend out at an equal height, or the top surface of the sliding block is a step surface which is raised step by step from outside to inside, wherein each step surface comprises a through hole, the top ends of the flexible spraying pipes are configured to penetrate in the corresponding through holes, and extend out from outside to inside at heights reduced step by step.

* * * * *